United States Patent
Kammer et al.

(10) Patent No.: US 11,313,354 B2
(45) Date of Patent: Apr. 26, 2022

(54) SYSTEM AND METHOD FOR PROTECTING A WIND TURBINE FROM OVERLOADING DUE TO PITCH SYSTEM FAULT

(71) Applicant: General Electric Company, Schenectady, NY (US)

(72) Inventors: Leonardo Cesar Kammer, Niskayuna, NY (US); Conner Brooks Shane, Glenville, NY (US); Dana Perry Martin, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 115 days.

(21) Appl. No.: 16/903,737

(22) Filed: Jun. 17, 2020

(65) Prior Publication Data
US 2021/0396208 A1   Dec. 23, 2021

(51) Int. Cl.
*F03D 7/02* (2006.01)
*F03D 17/00* (2016.01)

(52) U.S. Cl.
CPC ......... *F03D 7/0224* (2013.01); *F03D 7/0276* (2013.01); *F03D 17/00* (2016.05); *F05B 2270/107* (2013.01); *F05B 2270/309* (2013.01); *F05B 2270/327* (2013.01)

(58) Field of Classification Search
CPC .. F03D 7/0224; F03D 17/00; F05B 2270/107; F05B 2270/309; F05B 2270/327
See application file for complete search history.

(56) References Cited

U.S. PATENT DOCUMENTS

| | | | | |
|---|---|---|---|---|
| 7,719,128 B2 * | 5/2010 | Kammer | ............... | F03D 7/0204 290/44 |
| 7,755,210 B2 * | 7/2010 | Kammer | ................. | F03D 7/043 290/44 |
| 2011/0158805 A1 | 6/2011 | Miranda et al. | | |

FOREIGN PATENT DOCUMENTS

| | | |
|---|---|---|
| EP | 2713049 A1 | 4/2014 |
| EP | 2886856 A1 | 6/2015 |
| EP | 3524810 A1 | 8/2019 |

OTHER PUBLICATIONS

European Search Report for EP Application No. 21179059,7, dated Oct. 22, 2021.

* cited by examiner

*Primary Examiner* — Michael L Sehn
(74) *Attorney, Agent, or Firm* — Dority & Manning, P.A.

(57) ABSTRACT

A method for protecting a wind turbine from overloading during operation caused by a fault includes receiving, via a controller, a plurality of pitch signals from a plurality of pitch control mechanisms of a pitch system of the wind turbine, the pitch system configured to rotate a plurality of rotor blades mounted to a rotatable hub of a rotor of the wind turbine about respective pitch axes. Further, the method includes determining a collective pitch rate of the pitch system as a function of the plurality of pitch signals. The method also includes defining a minimum pitch rate threshold that varies with a speed parameter of the wind turbine. Moreover, the method includes receiving a first speed parameter of the wind turbine. In addition, the method includes comparing the collective pitch rate to the minimum pitch rate threshold for the first speed parameter. Thus, the method includes controlling the wind turbine based on the comparison.

20 Claims, 5 Drawing Sheets

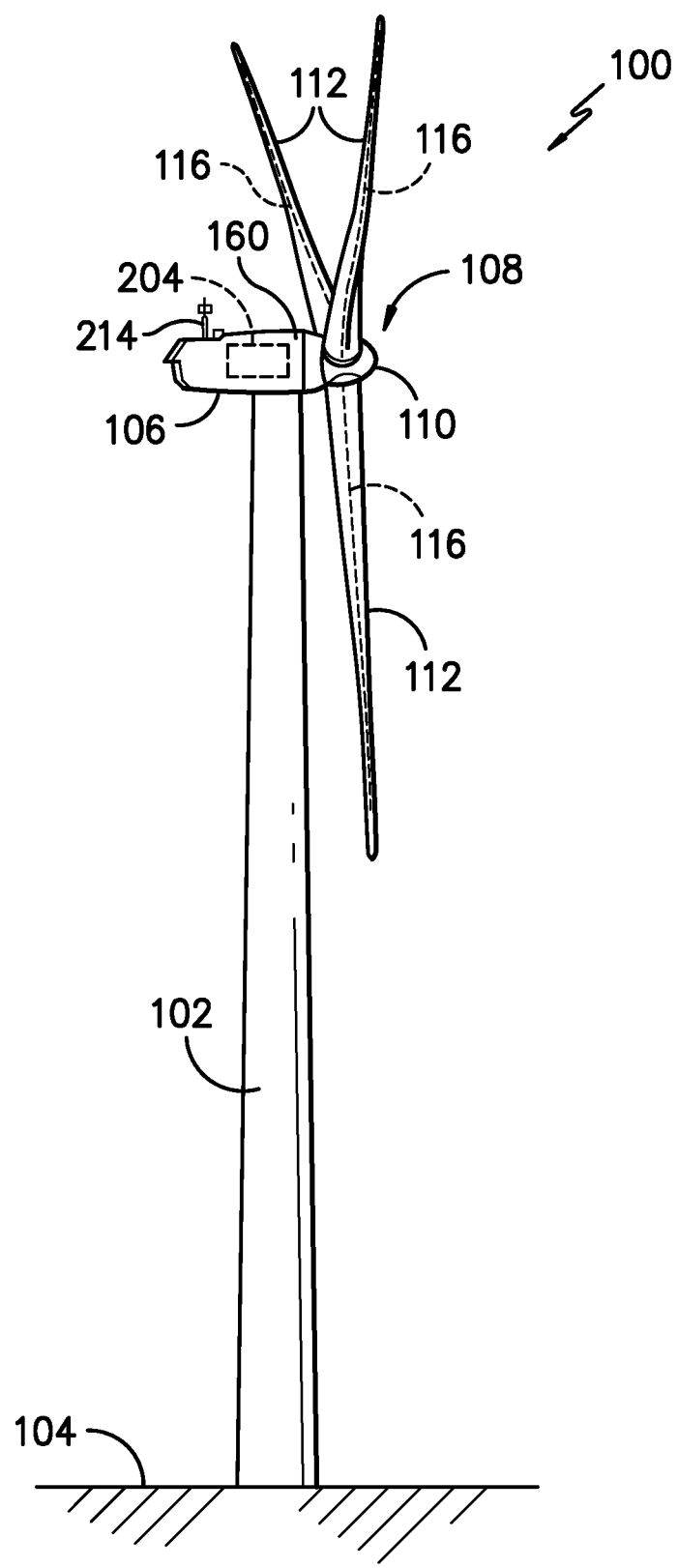
FIG. -1-

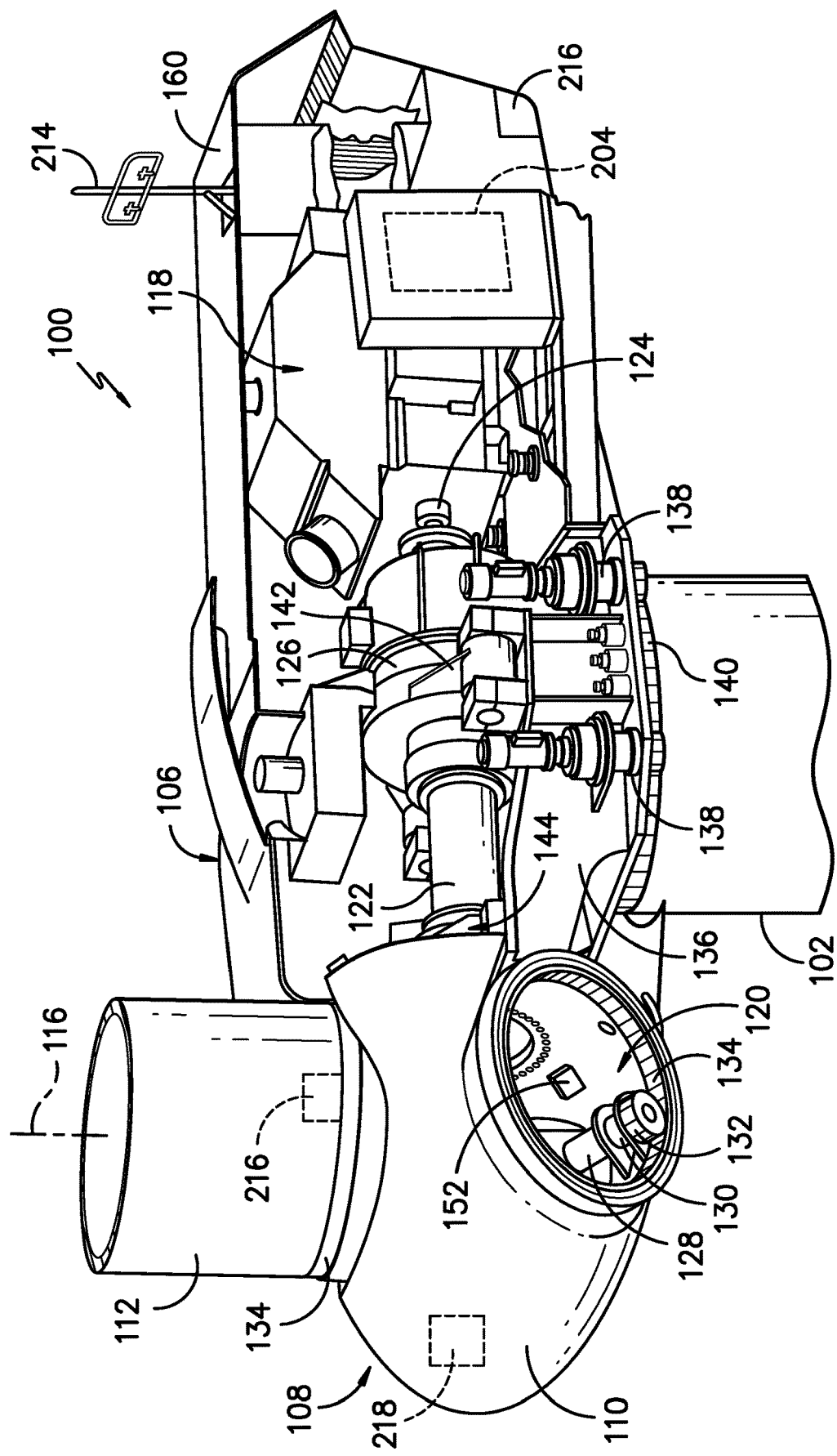
FIG. -2-

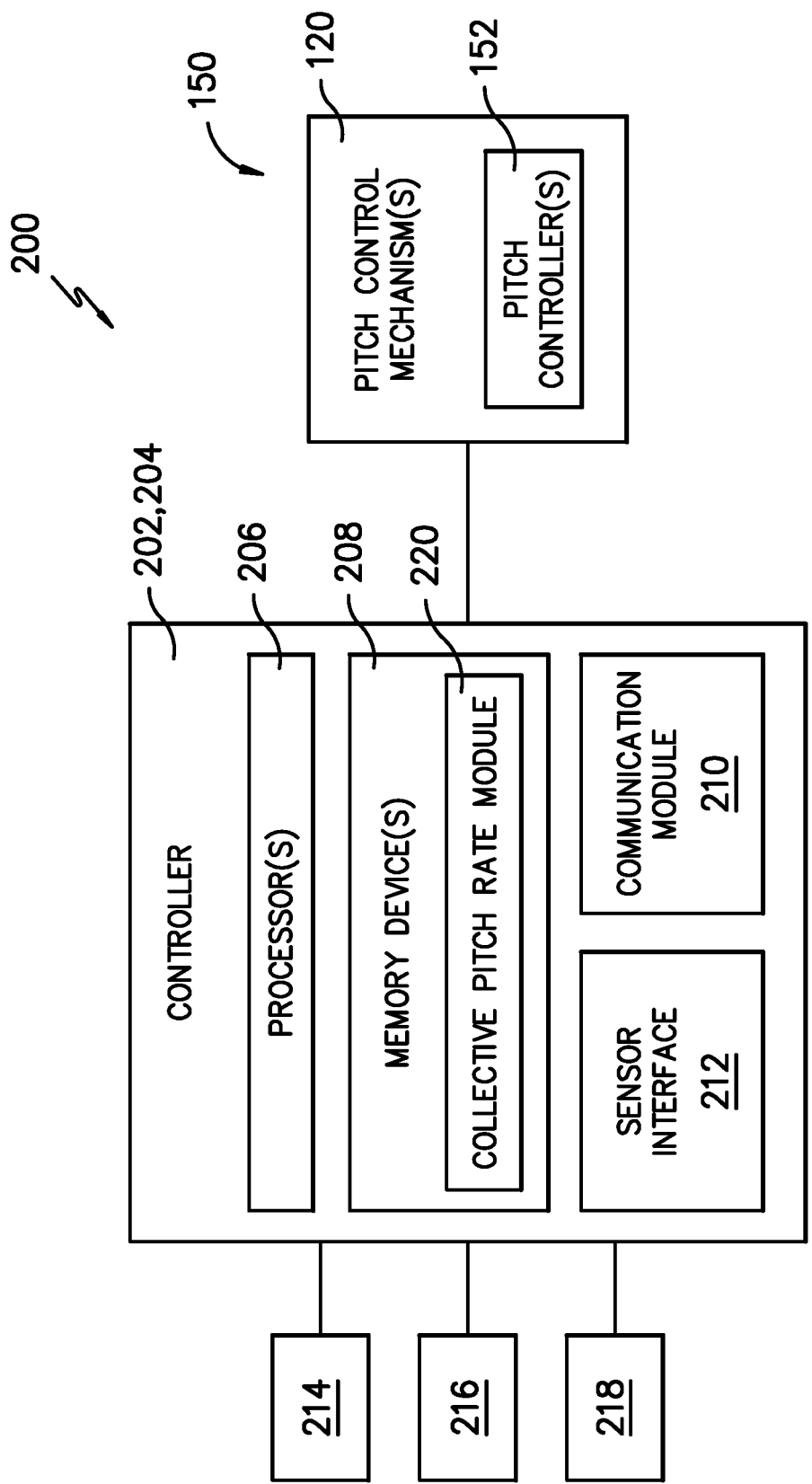
FIG. -3-

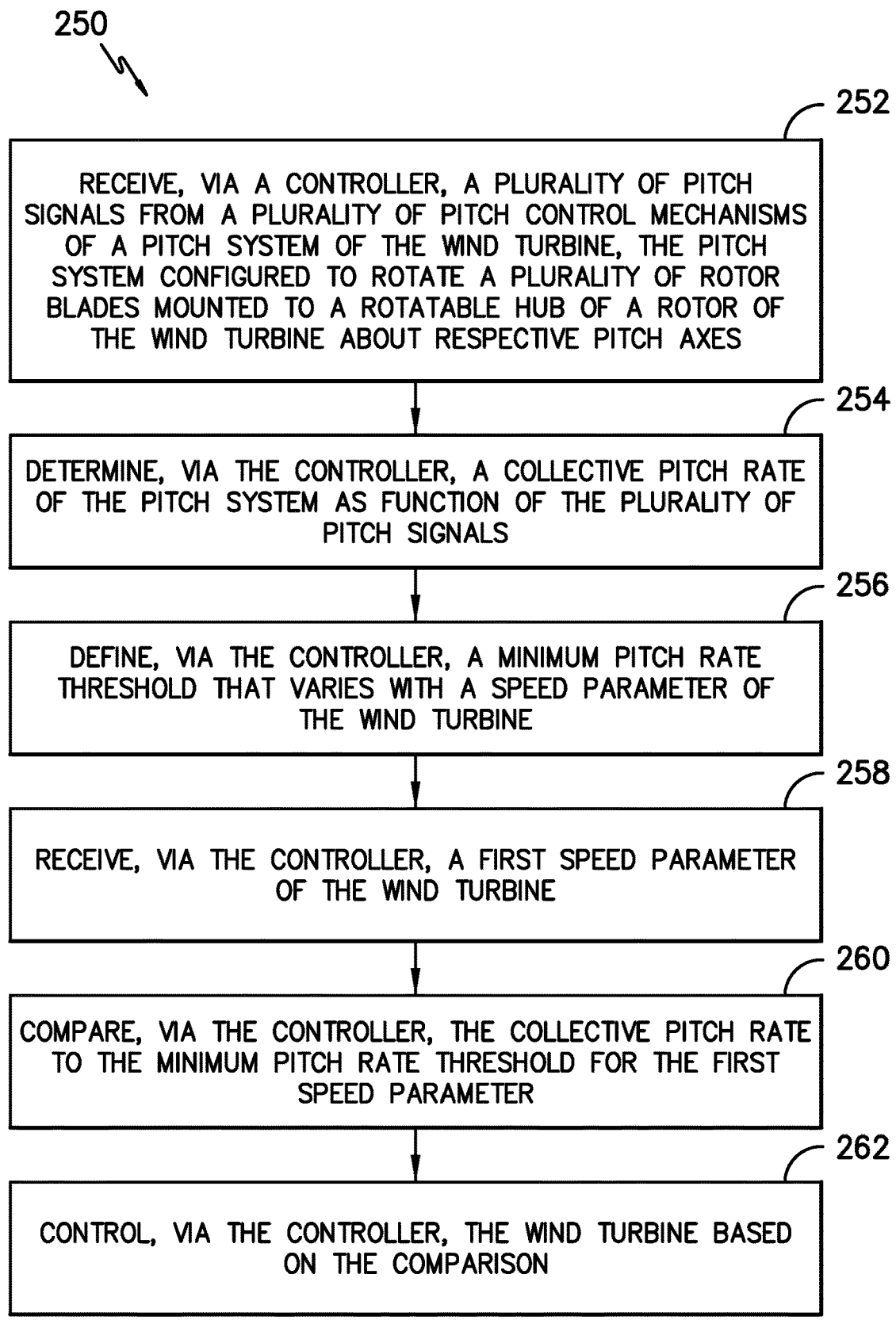
FIG. -4-

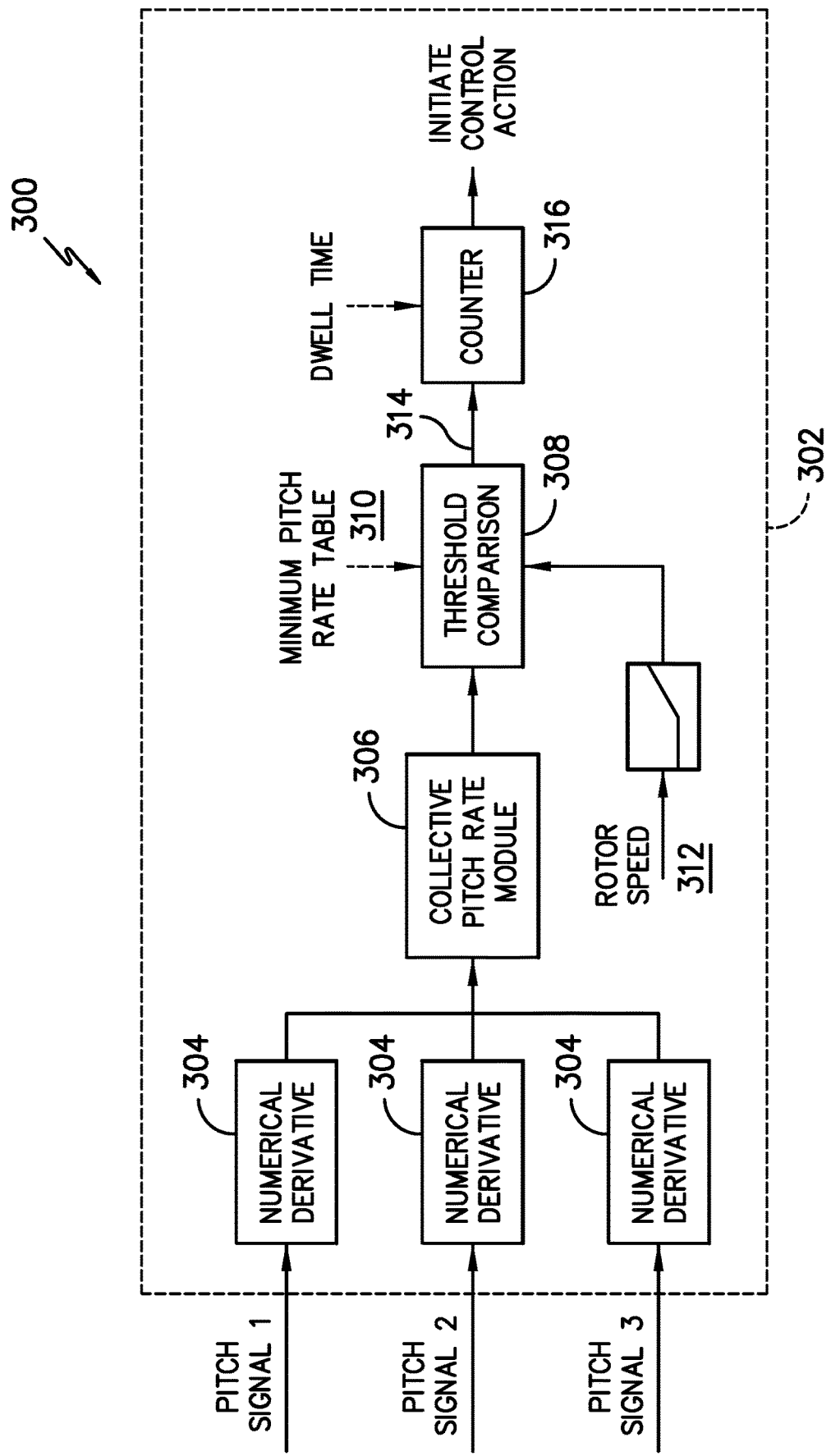
FIG. -5-

SYSTEM AND METHOD FOR PROTECTING A WIND TURBINE FROM OVERLOADING DUE TO PITCH SYSTEM FAULT

FIELD

The present disclosure relates in general to wind turbines, and more particularly to systems and methods for operating a wind turbine to protect the wind turbine from overloading caused by a fault in a pitch system thereof.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. The one or more rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy the electrical energy may be transmitted to a converter and/or a transformer housed within the tower and subsequently deployed to a utility grid.

During operation, the velocity of the wind which powers the wind turbine may change. The wind turbine may, thus, including a pitch system having a plurality of pitch adjustment mechanisms (i.e. one for each rotor blade) to adjust the pitch of the individual rotor blades about a pitch axis. During normal operations, the pitch adjustment mechanisms receives pitch commands from the turbine controller. For wind speeds below the rated threshold of the wind turbine, the turbine controller may calculate the desired pitch of the individual rotor blades so as to maximize the power produced at the given wind speed. For wind speeds above the rated threshold of the wind turbine, the turbine controller may calculate the desired pitch of the individual rotor blades so as to reduce thrust production below a specified design limit.

If one or more of the pitch adjustment mechanisms experience a fault or software glitch, however, the pitch system may continue pitching the rotor blades in a manner that would overload the wind turbine. Alternatively, faults in other turbine components may lead the controller to send pitch commands towards fine pitch, while the rotor speed is deemed high.

Thus, the art is continuously seeking new and improved systems and methods that address the aforementioned issues. Accordingly, the present disclosure is directed to systems and methods for operating a wind turbine to protect the wind turbine from overloading caused by a fault in a pitch system thereof. In particular, the present disclosure is directed to a system and method for collective pitch rate supervision that allows for flexibility in defining a pitch rate threshold.

BRIEF DESCRIPTION

Aspects and advantages of the invention will be set forth in part in the following description, or may be obvious from the description, or may be learned through practice of the invention.

In one aspect, the present disclosure is directed to a method for protecting a wind turbine from overloading during operation caused by a fault. The method includes receiving, via a controller, a plurality of pitch signals from a plurality of pitch control mechanisms of a pitch system of the wind turbine, the pitch system configured to rotate a plurality of rotor blades mounted to a rotatable hub of a rotor of the wind turbine about respective pitch axes. Further, the method includes determining, via the controller, a collective pitch rate of the pitch system as a function of the plurality of pitch signals. The method also includes defining, via the controller, a minimum pitch rate threshold that varies with a speed parameter of the wind turbine. Moreover, the method includes receiving, via the controller, a first speed parameter of the wind turbine. In addition, the method includes comparing, via the controller, the collective pitch rate to the minimum pitch rate threshold for the first speed parameter. Thus, the method includes controlling, via the controller, the wind turbine based on the comparison.

In an embodiment, the method includes measuring the plurality of pitch signals via a plurality of sensors. In one embodiment, the plurality of pitch signals may include plurality of pitch speed signals.

In alternative embodiments, the plurality of pitch signals may include a plurality of pitch position signals. In such embodiments, the method may include determining a derivative of each of the plurality of pitch position signals to obtain a plurality of pitch speed signals. In addition, the method may also include filtering the derivatives of the plurality of pitch positions to reduce noise.

In further embodiments, determining the collective pitch rate as a function of the plurality of pitch signals may include averaging the plurality of pitch signals to obtain the collective pitch rate.

In additional embodiment, the speed parameter of the wind turbine may include rotor speed, generator speed, or derivatives thereof as well as any other suitable speed parameter of the wind turbine.

In certain embodiments, comparing the collective pitch rate to the minimum pitch rate threshold for the first speed parameter may include utilizing a look-up table.

In another embodiment, controlling the wind turbine based on the comparison may include pitching the plurality of pitch control mechanisms at a constrained pitch rate if the speed parameter is below a speed threshold for a certain time period and implementing a control action if the speed parameter is above the speed threshold for a certain time period. In such embodiments, the control action may include shutting down the wind turbine, pitching the plurality of pitch control mechanisms at a maximum pitch rate, derating the wind turbine, or any other suitable corrective actions.

In still another embodiment, the controller may be a turbine controller or a separate controller module communicatively coupled to the turbine controller.

In another aspect, the present disclosure is directed to a pitch system for a wind turbine. The pitch system includes a plurality of pitch control mechanisms for generating a plurality of pitch signals associated with a plurality of rotor blades mounted to a rotatable hub of a rotor of the wind turbine and a controller communicatively coupled to the plurality of pitch control mechanisms. The controller includes at least one processor configured to perform a plurality of operations, including but not limited to determining a collective pitch rate of the pitch system as a function of the plurality of pitch signals, defining a minimum pitch rate threshold that varies with a speed parameter of the wind turbine, receiving a first speed parameter of the wind turbine, comparing the collective pitch rate to the minimum pitch rate threshold for the first speed parameter, and controlling the wind turbine based on the comparison. It should be understood that the pitch system may further include any of the additional steps and/or features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine according to the present disclosure;

FIG. 2 illustrates a perspective, internal view of a nacelle of a wind turbine according to one embodiment of the present disclosure;

FIG. 3 illustrates a schematic diagram of one embodiment of a system for controlling a wind turbine according to the present disclosure;

FIG. 4 illustrates a flow diagram of one embodiment of method for protecting a wind turbine from overloading during operation caused by a fault according to the present disclosure; and FIG. 5 illustrates a schematic diagram of one embodiment of system for operating a wind turbine to protect the wind turbine from overloading caused by a fault in pitch system thereof according to the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present disclosure is directed to systems and methods for operating a wind turbine to protect the wind turbine from overloading caused by a fault in a pitch system thereof. In particular, the present disclosure may include a system and method that monitors the pitch rate feedback from the pitch system of the wind turbine and converts the individual pitch rates to a collective pitch rate. The collective pitch rate can then be compared to a minimum pitch rate threshold defined as a function of rotor speed. If the collective pitch rate is below the threshold for a defined amount of time, the turbine controller can trigger a turbine shutdown. Further, one aspect of the present disclosure is defining hazardous pitch activity. In particular, the system and method of the present disclosure introduces a concept to define the minimum pitch rate threshold as a function of rotor speed. At low rotor speeds, the wind turbine can continue pitching at its full rate to power. However, at higher rotor speeds, pitching to power at full rate can be hazardous. Therefore, defining the threshold as a function of rotor speed provides the maximum flexibility for this supervision. Accordingly, the present disclosure addresses previous issues associated with defining a constant threshold with a large conservative margin that may delay triggering a shutdown when needed. In addition, the present disclosure also addresses issues associated with defining the constant threshold to minimize the time to trigger a shutdown, which can result in shutting down the wind turbine too quickly, thereby causing nuisance trips or restrictions during service operations. Still further advantages of the present disclosure include protecting the wind turbine against faults/failures that result in pitching in a way to overload the wind turbine.

Referring now to the drawings, FIG. 1 illustrates a perspective view of one embodiment of a wind turbine 100 according to the present disclosure. As shown, the wind turbine 100 generally includes a tower 102 extending from a support surface 104, a nacelle 106, which includes an outer shell 160, mounted on the tower 102, and a rotor 108 coupled to the nacelle 106. The rotor 108 includes a rotatable hub 110 and at least one rotor blade 112 coupled to and extending outwardly from the hub 110. For example, in the illustrated embodiment, the rotor 108 includes three rotor blades 112. However, in an alternative embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator 118 (FIG. 2) positioned within the nacelle 106 to permit electrical energy to be produced.

The wind turbine 100 may also include a controller 202 (FIG. 3). In an embodiment, the controller 202 may be a wind turbine controller 204 centralized within the nacelle 106. However, in other embodiments, the controller 202 may be located within any other component of the wind turbine 100 or at a location outside the wind turbine. Further, the controller 202 may be communicatively coupled to any number of the components of the wind turbine 100 in order to control the components. As such, the controller 202 may include a computer or other suitable processing unit. Thus, in several embodiments, the controller 202 may include suitable computer-readable instructions that, when implemented, configure the controller 202 to perform various different functions, such as receiving, transmitting and/or executing wind turbine control signals.

Referring now to FIG. 2, a simplified, internal view of one embodiment of the nacelle 106 of the wind turbine 100 shown in FIG. 1 is illustrated. As shown, the generator 118 may be coupled to the rotor 108 for producing electrical power from the rotational energy generated by the rotor 108. For example, as shown in the illustrated embodiment, the rotor 108 may include a rotor shaft 122 coupled to the hub 110 for rotation therewith. The rotor shaft 122 may be rotatably supported by a main bearing 144. The rotor shaft 122 may, in turn, be rotatably coupled to a generator shaft 124 of the generator 118 through a gearbox 126 connected to a bedplate support frame 136 by one or more torque arms 142. As is generally understood, the rotor shaft 122 may provide a low speed, high torque input to the gearbox 126 in response to rotation of the rotor blades 112 and the hub 110. The gearbox 126 may then be configured to convert the low speed, high torque input to a high speed, low torque output to drive the generator shaft 124 and, thus, the generator 118.

The wind turbine 100 may also include a pitch system 150 for controlling a pitch angle of each of the rotor blades 112. In particular, as shown in FIGS. 2 and 3, the pitch system 150 may include a plurality of pitch control mechanisms 120, e.g. one for controlling rotation of each rotor blade 112 about its pitch axis 116. The pitch control mechanism(s) 120 may include a pitch controller 152 configured to receive at least one pitch setpoint command from the controller 202. Further, each pitch control mechanism(s) 120 may include a pitch drive motor 128 (e.g., any suitable electric, hydraulic, or pneumatic motor), a pitch drive gearbox 130, and a pitch drive pinion 132. In such embodiments, the pitch drive motor 128 may be coupled to the pitch drive gearbox 130 so that the pitch drive motor 128 imparts mechanical force to the pitch drive gearbox 130. Similarly, the pitch drive gearbox 130 may be coupled to the pitch drive pinion 132 for rotation therewith. The pitch drive pinion 132 may, in turn, be in rotational engagement with a pitch bearing 134 coupled between the hub 110 and a corresponding rotor blade 112 such that rotation of the pitch drive pinion 132 causes rotation of the pitch bearing 134. Thus, in such embodiments, rotation of the pitch drive motor 128 drives the pitch drive gearbox 130 and the pitch drive pinion 132, thereby rotating the pitch bearing 134 and the rotor blade(s) 112 about the pitch axis 116. Similarly, the wind turbine 100 may include one or more yaw drive mechanisms 138 communicatively coupled to the controller 202, with each yaw drive mechanism(s) 138 being configured to change the angle of the nacelle 106 relative to the wind (e.g., by engaging a yaw bearing 140 of the wind turbine 100).

Rotation of each rotor blade 112 about its pitch axis 116 by its respective pitch control mechanism 120 may establish a pitch angle for each of the rotor blades 112. In an embodiment, the pitch angle may be an angular deviation from a zero-pitch location. The zero-pitch location may, for example, be established during blade installation through reliance on a mechanical reference at the blade root or a protrusion which triggers a limit switch to automate the calibration process. The controller 202 may track the pitch angle of the rotor blade(s) 112 based on a cumulative deviation from the zero-pitch location. The controller 202 may, thus, transmit the pitch setpoint command(s) to the pitch control mechanisms 120 directing that the rotor blade(s) 112 be rotated through a specified number of degrees, as interpreted by a motor mounted encoder, relative to the perceived pitch angle of the rotor blade(s) 112.

Still referring to FIG. 2, one or more sensors 214, 216, 218 may be provided on the wind turbine 100 to monitor the performance of the wind turbine 100 and/or environmental conditions affecting the wind turbine 100. It should also be appreciated that, as used herein, the term "monitor" and variations thereof indicates that the various sensors of the wind turbine 100 may be configured to provide a direct measurement of the parameters being monitored or an indirect measurement of such parameters. Thus, the sensors described herein may, for example, be used to generate signals relating to the parameter being monitored, which can then be utilized by the controller 202 to determine the condition.

Referring now to FIG. 3, a schematic diagram of one embodiment of a system 200 for controlling a wind turbine 100 according to the present disclosure is presented. As shown, suitable components may be included within the controller 202 according to the present disclosure. As shown, the controller 202 may include one or more processor(s) 206 and associated memory device(s) 208 configured to perform a variety of computer-implemented functions (e.g., performing the methods, steps, calculations and the like and storing relevant data as disclosed herein). Additionally, the controller 202 may also include a communications module 210 to facilitate communications between the controller 202 and the various components of the wind turbine 100. Further, the communications module 210 may include a sensor interface 212 (e.g., one or more analog-to-digital converters) to permit signals transmitted from one or more sensors 214, 216, 218 to be converted into signals that can be understood and processed by the processors 206. It should be appreciated that the sensors 214, 216, 218 may be communicatively coupled to the communications module 210 using any suitable means. For example, as shown in FIG. 3, the sensors 214, 216, 218 are coupled to the sensor interface 212 via a wired connection. However, in other embodiments, the sensors 214, 216, 218 may be coupled to the sensor interface 212 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 208 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 208 may generally be configured to store suitable computer-readable instructions that, when implemented by the processor(s) 206, configure the controller 202 to perform various functions including, but not limited to, calculating a collective pitch offset and using the collective pitch offset in the control of the turbine 100, as described herein, as well as various other suitable computer-implemented functions.

As shown generally in FIGS. 1-3, the system 200 may include at least one first sensor 214 configured for monitoring a wind condition at the wind turbine or acting on the rotor 108. The first sensor(s) 214 may, for example, be a wind vane, an anemometer, a lidar sensor, or other suitable sensor. The wind condition may include and the first sensor(s) 214 may be configured to measure wind speed, wind direction, wind shear, wind gust and/or wind veer. In at least one embodiment, the first sensor(s) 214 may be mounted to the nacelle 106 at a location downwind of the rotor 108. The first sensor(s) 214 may, in alternative embodiments, be coupled to or integrated with the rotor 108. It should be appreciated that the first sensor(s) 214 may include a network of sensors and may be positioned away from the wind turbine 100. In an embodiment, the system 200 may include at least one second sensor 216 configured for monitoring a loading condition of the wind turbine 100, such as a loading of one of the rotor blades 112. Moreover, as shown in FIGS. 2 and 3, the system 200 may also include at least one third sensor 218 configured for monitoring an environmental condition or an operating condition of the wind turbine 100. For example, the third sensor(s) 218 may be a power sensor configured to monitor the power output of the generator 118.

In an embodiment, the sensors 214, 216, 218 may be any suitable sensor such as a proximity sensor, an inductive sensor, a Miniature Inertial Measurement Unit (MIMU), a pressure sensor, an accelerometer, a SODAR sensor, a LIDAR sensor, an optical sensor, or similar sensor. The sensors 214, 216, 218 may, for example, be configured to provide the controller 202 with measurements relating to air temperature, component temperature, air pressure, and/or rotational speed of the rotor blade(s) 112. Further, the sensors 214, 216, 218 may also include a network of sensors or a single sensor.

In accordance with the present disclosure, the controller 202 of the system 200, such as depicted in FIG. 3, may include a collective pitch rate module 220 for determining the collective pitch rate as described herein. Alternatively, the collective pitch rate module 220 may be a component of the wind turbine controller 204 or may be a component of a separate controller 202. In such embodiments, the utilization of a separate controller 202 may facilitate the determination of the collective pitch rate without requiring access to the software and/or hardware of the wind turbine controller 204.

In addition, in an embodiment, the collective pitch rate module 220 may be configured to execute one or more suitable data processing techniques or algorithms. The techniques or algorithms may allow the controller 202 or the wind turbine controller 204 to accurately and efficiently analyze the sensor data from the sensors 214, 216, 218. Further, the collective pitch rate module 220 may apply corrections or adjustments to the received data based on the sensor type, sensor resolution, and/or other parameters associated with the wind conditions or wind turbine 100 operations. In one instance, for example, the collective pitch rate module 220 may filter the data to remove outliers, by implementing sub-routines or intermediate calculations required to calculate the collective pitch angle, and/or by performing any other desired data processing-related techniques or algorithms.

Referring now to FIGS. 4 and 5, a method 250 and system 300 for protecting a wind turbine from overloading during operation caused by a fault, e.g. from a pitch system, are illustrated, respectively. In particular, FIG. 4 illustrates a flow diagram of one embodiment of a method 250 for operating a wind turbine to protect the wind turbine from overloading caused by a fault in pitch system thereof is illustrated. The method 250 may be implemented using, for instance, the system 300 discussed with reference to FIG. 4. Further, FIG. 4 depicts steps performed in a particular order for purposes of illustration and discussion. Those of ordinary skill in the art, using the disclosures provided herein, will understand that various steps of the method 250, or any of the methods disclosed herein, may be adapted, modified, rearranged, performed simultaneously, or modified in various ways without deviating from the scope of the present disclosure.

As shown at (252), the method 250 receiving, via a controller, a plurality of pitch signals from a plurality of pitch control mechanisms of a pitch system of the wind turbine, the pitch system configured to rotate a plurality of rotor blades mounted to a rotatable hub of a rotor of the wind turbine 100 about respective pitch axes. For example, as shown in FIG. 5, the system 300 may include a controller 302 (such as turbine controller 204 or a separate controller as described herein) that receives measured pitch signals from each of the pitch controllers 152 of each pitch control mechanisms (i.e. one from each rotor blade 112). Thus, in an embodiment, the pitch signals may be measured via a plurality of sensors (such as any of sensors 214, 216, 218). In another embodiment, the plurality of pitch signals may include plurality of pitch speed signals.

Alternatively, in an embodiment, the plurality of pitch signals may include a plurality of pitch position signals. In such embodiments, the method 250 may include determining a derivative of each of the pitch position signals (e.g. via numerical derivative modules 304) to obtain a plurality of pitch speed signals. In addition, in such embodiments, where the pitch signals are position signals, the method 250 may also include filtering the derivatives of the pitch positions so as to reduce noise in the signals. If, however, the pitch signals correspond to pitch speed signals, such signals can be directly input into the controller 302 without first determining the derivatives thereof and/or without filtering.

Referring back to FIG. 4, as shown at (254), the method 250 includes determining, via the controller 302, a collective pitch rate of the pitch system 150 as a function of the plurality of pitch signals. For example, as shown in FIG. 5, the controller 302 may include a collective pitch rate module 306 for determining the collective pitch rate of the pitch system 150. More particularly, in an embodiment, the collective pitch rate module 306 may determine the collective pitch rate by averaging the plurality of pitch signals.

In an embodiment, the controller 302 may determine the collective pitch rate continuously, at a predetermined interval, and/or in response to a specified sensor input. In a further embodiment, the controller 302 may calculate the collective pitch rate at a predetermined interval (e.g. daily, weekly, monthly, etc.). In yet in an additional embodiment, the receipt of a fault signal from a sensor, such as an indication relating to an unexpected output of the generator, may trigger the controller 302 to calculate the collective pitch rate.

Referring back to FIG. 4, as shown at (256), the method 250 includes defining, via the controller 302, a minimum pitch rate threshold that varies with a speed parameter of the wind turbine 100. For example, in an embodiment, the speed parameter of the wind turbine 100 may include rotor speed, generator speed, or derivatives thereof as well as any other suitable speed parameter of the wind turbine 100. Moreover, in an embodiment, the controller 302 may define the minimum pitch rate threshold by generating a plot, table, graph, table, or the like in which pitch rate values correspond with speed parameters.

Further, as shown at (258), the method 250 includes receiving, via the controller 302, a first speed parameter of the wind turbine 100. For example, in an embodiment, as mentioned, the first speed parameter of the wind turbine 100 may include rotor speed, generator speed, or any other suitable speed parameter of the wind turbine 100. Thus, such speed parameters may be determined or calculated by the controller 302 or may be measured via one of the sensors described herein.

Accordingly, referring still to FIG. 4, as shown at (260), the method 250 includes comparing, via the controller 302, the collective pitch rate (e.g. from the collective pitch rate module 306) to the minimum pitch rate threshold for the first speed parameter. In certain embodiments, as shown in FIG. 5, the controller 302 may include a threshold comparison module 308 for comparing the collective pitch rate to the minimum pitch rate threshold for the first speed parameter. More particularly, as shown in the illustrated embodiment, the threshold comparison module 308 may receive the collective pitch rate, a look-up table (e.g. the minimum pitch rate table 310) and the rotor speed and may generate an output 314.

Referring back to FIG. 4, as shown at (262), the method 250 includes controlling, via the controller 302, the wind turbine 100 based on the comparison (e.g. the output 314). For example, in an embodiment, as shown in FIG. 5, the controller 302 is configured to implement a control action. In particular, in an embodiment, if the speed parameter is below a speed threshold for a certain time period (e.g. as determined via counter 316), the controller 302 may pitch the plurality of pitch control mechanisms 120 at a constrained pitch rate. Alternatively, if the speed parameter is above the speed threshold for a certain time period, the controller 302 may implement a control action to protect the wind turbine 100 from overloading. In such embodiments, for example, the control action may include shutting down the wind turbine 100, pitching the plurality of pitch control mechanisms at a maximum pitch rate, derating the wind turbine 100, or any other suitable corrective actions.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1. A method for protecting a wind turbine from overloading during operation caused by a fault, the method comprising:

receiving, via a controller, a plurality of pitch signals from a plurality of pitch control mechanisms of a pitch system of the wind turbine, the pitch system configured to rotate a plurality of rotor blades mounted to a rotatable hub of a rotor of the wind turbine about respective pitch axes;

determining, via the controller, a collective pitch rate of the pitch system as a function of the plurality of pitch signals;

defining, via the controller, a minimum pitch rate threshold that varies with a speed parameter of the wind turbine;

receiving, via the controller, a first speed parameter of the wind turbine; comparing, via the controller, the collective pitch rate to the minimum pitch rate threshold for the first speed parameter; and, controlling, via the controller, the wind turbine based on the comparison.

Clause 2. The method of any of the preceding claims, further comprising measuring the plurality of pitch signals via a plurality of sensors.

Clause 3. The method of any of the preceding claims, wherein the plurality of pitch signals comprise plurality of pitch speed signals.

Clause 4. The method of any of the preceding claims, wherein the plurality of pitch signals comprise a plurality of pitch position signals.

Clause 5. The method of clause 4, further comprising determining a derivative of each of the plurality of pitch position signals to obtain a plurality of pitch speed signals.

Clause 6. The method of clause 5, further comprising filtering the derivatives of the plurality of pitch positions to reduce noise.

Clause 7. The method of any of the preceding claims, wherein determining the collective pitch rate as a function of the plurality of pitch signals further comprises averaging the plurality of pitch signals to obtain the collective pitch rate.

Clause 8. The method of any of the preceding claims, wherein the speed parameter of the wind turbine comprises at least one of rotor speed or generator speed.

Clause 9. The method of any of the preceding claims, wherein comparing the collective pitch rate to the minimum pitch rate threshold for the first speed parameter further comprises utilizing a look-up table.

Clause 10. The method of any of the preceding claims, wherein controlling the wind turbine based on the comparison further comprises pitching the plurality of pitch control mechanisms at a constrained pitch rate if the speed parameter is below a speed threshold for a certain time period and implementing a control action if the speed parameter is above the speed threshold for a certain time period.

Clause 11. The method of any of the preceding claims, wherein the control action further comprises at least one of shutting down the wind turbine, pitching the plurality of pitch control mechanisms at a maximum pitch rate, or derating the wind turbine.

Clause 12. The method of any of the preceding claims, wherein the controller comprises at least one of a turbine controller or a separate controller module communicatively coupled to the turbine controller.

Clause 13. A pitch system for a wind turbine, comprising:
a plurality of pitch control mechanisms for generating a plurality of pitch signals associated with a plurality of rotor blades mounted to a rotatable hub of a rotor of the wind turbine;
a controller communicatively coupled to the plurality of pitch control mechanisms, the controller comprising at least one processor configured to perform a plurality of operations, the plurality of operations comprising:
determining a collective pitch rate of the pitch system as a function of the plurality of pitch signals;
defining a minimum pitch rate threshold that varies with a speed parameter of the wind turbine;
receiving a first speed parameter of the wind turbine;
comparing the collective pitch rate to the minimum pitch rate threshold for the first speed parameter; and,
controlling the wind turbine based on the comparison.

Clause 14. The pitch system of clause 13, further comprising a plurality of sensors for measuring the plurality of pitch signals.

Clause 15. The pitch system of clause 14, wherein the plurality of pitch signals comprise plurality of pitch speed signals.

Clause 16. The pitch system of clauses 13-15, wherein the plurality of pitch signals comprise a plurality of pitch position signals, the plurality of operations further comprising:
determining a derivative of each of the plurality of pitch position signals to obtain a plurality of pitch speed signals; and
filtering the derivatives of the plurality of pitch positions to reduce noise.

Clause 17. The pitch system of clauses 13-16, wherein determining the collective pitch rate as a function of the plurality of pitch signals further comprises averaging the plurality of pitch signals to obtain the collective pitch rate.

Clause 18. The pitch system of clauses 13-17, wherein the speed parameter of the wind turbine comprises at least one of rotor speed or generator speed.

Clause 19. The pitch system of clauses 13-18, wherein comparing the collective pitch rate to the minimum pitch rate threshold for the first speed parameter further comprises utilizing a look-up table.

Clause 20. The pitch system of clauses 13-19, wherein controlling the wind turbine based on the comparison further comprises pitching the plurality of pitch control mechanisms at a constrained pitch rate if the speed parameter is below a speed threshold for a certain time period and implementing a control action if the speed parameter is above the speed threshold for a certain time period, the control action further comprising at least one of shutting down the wind turbine, pitching the plurality of pitch control mechanisms at a maximum pitch rate, or derating the wind turbine.

What is claimed is:

1. A method for protecting a wind turbine from overloading during operation caused by a fault, the method comprising:
receiving, via a controller, a plurality of pitch signals from a plurality of pitch control mechanisms of a pitch system of the wind turbine, the pitch system configured to rotate a plurality of rotor blades mounted to a rotatable hub of a rotor of the wind turbine about respective pitch axes;
determining, via the controller, a collective pitch rate of the pitch system as a function of the plurality of pitch signals;
defining, via the controller, a minimum pitch rate threshold that varies with a speed parameter of the wind turbine;
receiving, via the controller, a first speed parameter of the wind turbine;
comparing, via the controller, the collective pitch rate to the minimum pitch rate threshold for the first speed parameter; and,
controlling, via the controller, the wind turbine based on the comparison.

2. The method of claim 1, further comprising measuring the plurality of pitch signals via a plurality of sensors.

3. The method of claim 1, wherein the plurality of pitch signals comprise plurality of pitch speed signals.

4. The method of claim 1, wherein the plurality of pitch signals comprise a plurality of pitch position signals.

5. The method of claim 4, further comprising determining a derivative of each of the plurality of pitch position signals to obtain a plurality of pitch speed signals.

6. The method of claim 5, further comprising filtering the derivatives of the plurality of pitch positions to reduce noise.

7. The method of claim 1, wherein determining the collective pitch rate as a function of the plurality of pitch signals further comprises averaging the plurality of pitch signals to obtain the collective pitch rate.

8. The method of claim 1, wherein the speed parameter of the wind turbine comprises at least one of rotor speed or generator speed.

9. The method of claim 1, wherein comparing the collective pitch rate to the minimum pitch rate threshold for the first speed parameter further comprises utilizing a look-up table.

10. The method of claim 1, wherein controlling the wind turbine based on the comparison further comprises pitching the plurality of pitch control mechanisms at a constrained pitch rate if the speed parameter is below a speed threshold for a certain time period and implementing a control action if the speed parameter is above the speed threshold for a certain time period.

11. The method of claim 1, wherein the control action further comprises at least one of shutting down the wind turbine, pitching the plurality of pitch control mechanisms at a maximum pitch rate, or derating the wind turbine.

12. The method of claim 1, wherein the controller comprises at least one of a turbine controller or a separate controller module communicatively coupled to the turbine controller.

13. A pitch system for a wind turbine, comprising:
a plurality of pitch control mechanisms for generating a plurality of pitch signals associated with a plurality of rotor blades mounted to a rotatable hub of a rotor of the wind turbine;
a controller communicatively coupled to the plurality of pitch control mechanisms, the controller comprising at least one processor configured to perform a plurality of operations, the plurality of operations comprising:
determining a collective pitch rate of the pitch system as a function of the plurality of pitch signals;
defining a minimum pitch rate threshold that varies with a speed parameter of the wind turbine;
receiving a first speed parameter of the wind turbine;
comparing the collective pitch rate to the minimum pitch rate threshold for the first speed parameter; and,
controlling the wind turbine based on the comparison.

14. The pitch system of claim 13, further comprising a plurality of sensors for measuring the plurality of pitch signals.

15. The pitch system of claim 14, wherein the plurality of pitch signals comprise plurality of pitch speed signals.

16. The pitch system of claim 13, wherein the plurality of pitch signals comprise a plurality of pitch position signals, the plurality of operations further comprising:

determining a derivative of each of the plurality of pitch position signals to obtain a plurality of pitch speed signals; and filtering the derivatives of the plurality of pitch positions to reduce noise.

17. The pitch system of claim 13, wherein determining the collective pitch rate as a function of the plurality of pitch signals further comprises averaging the plurality of pitch signals to obtain the collective pitch rate.

18. The pitch system of claim 13, wherein the speed parameter of the wind turbine comprises at least one of rotor speed or generator speed.

19. The pitch system of claim 13, wherein comparing the collective pitch rate to the minimum pitch rate threshold for the first speed parameter further comprises utilizing a look-up table.

20. The pitch system of claim 13, wherein controlling the wind turbine based on the comparison further comprises pitching the plurality of pitch control mechanisms at a constrained pitch rate if the speed parameter is below a speed threshold for a certain time period and implementing a control action if the speed parameter is above the speed threshold for a certain time period, the control action further comprising at least one of shutting down the wind turbine, pitching the plurality of pitch control mechanisms at a maximum pitch rate, or derating the wind turbine.

* * * * *